March 10, 1953  R. A. ROBERT ET AL  2,630,740
APPARATUS FOR LAUNCHING ROCKET BOMBS FROM AIRCRAFT
Filed Oct. 22, 1949  5 Sheets-Sheet 1
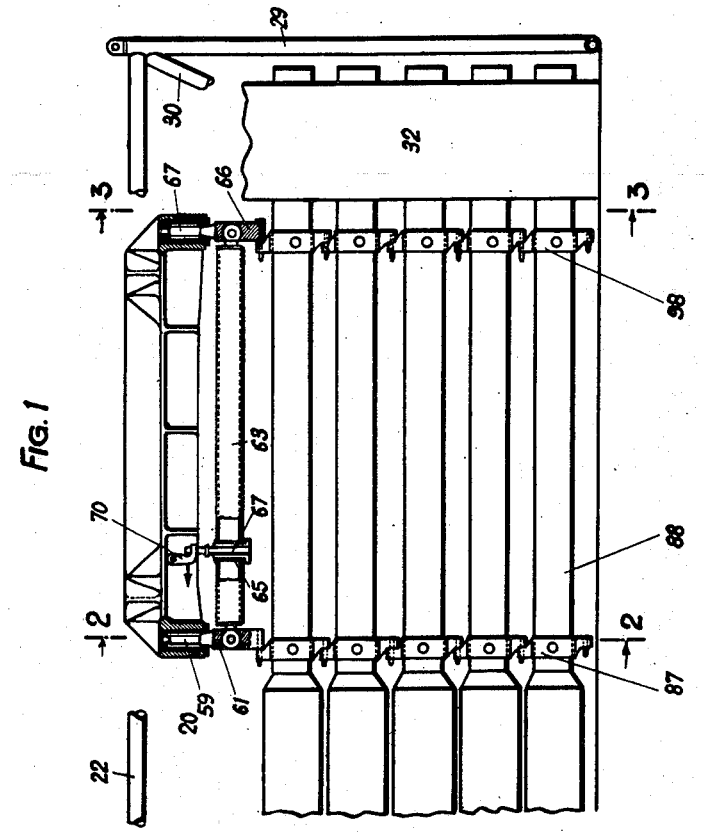
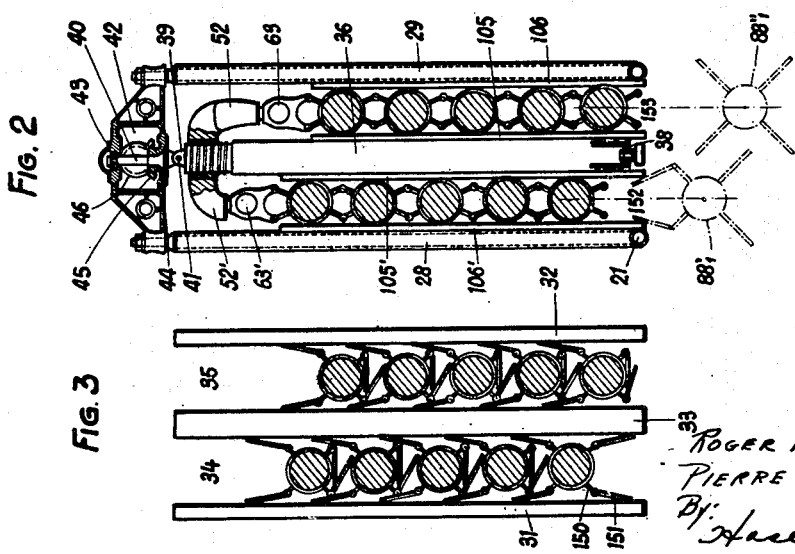
INVENTORS:
ROGER AIME ROBERT
PIERRE PAUL MATGE
By: Haseltine, Lake & Co.
AGENTS

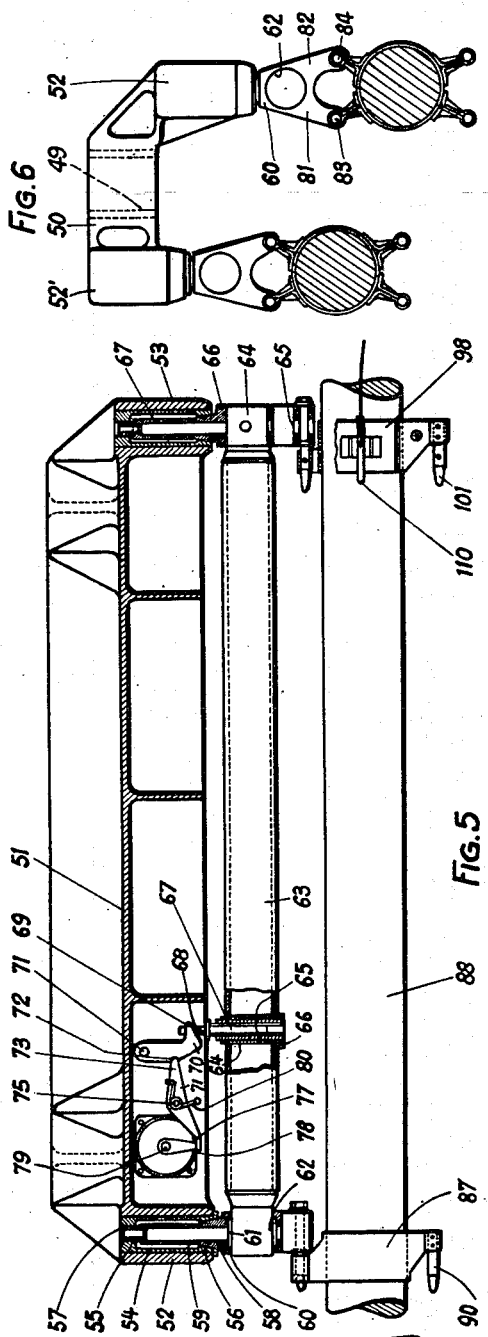

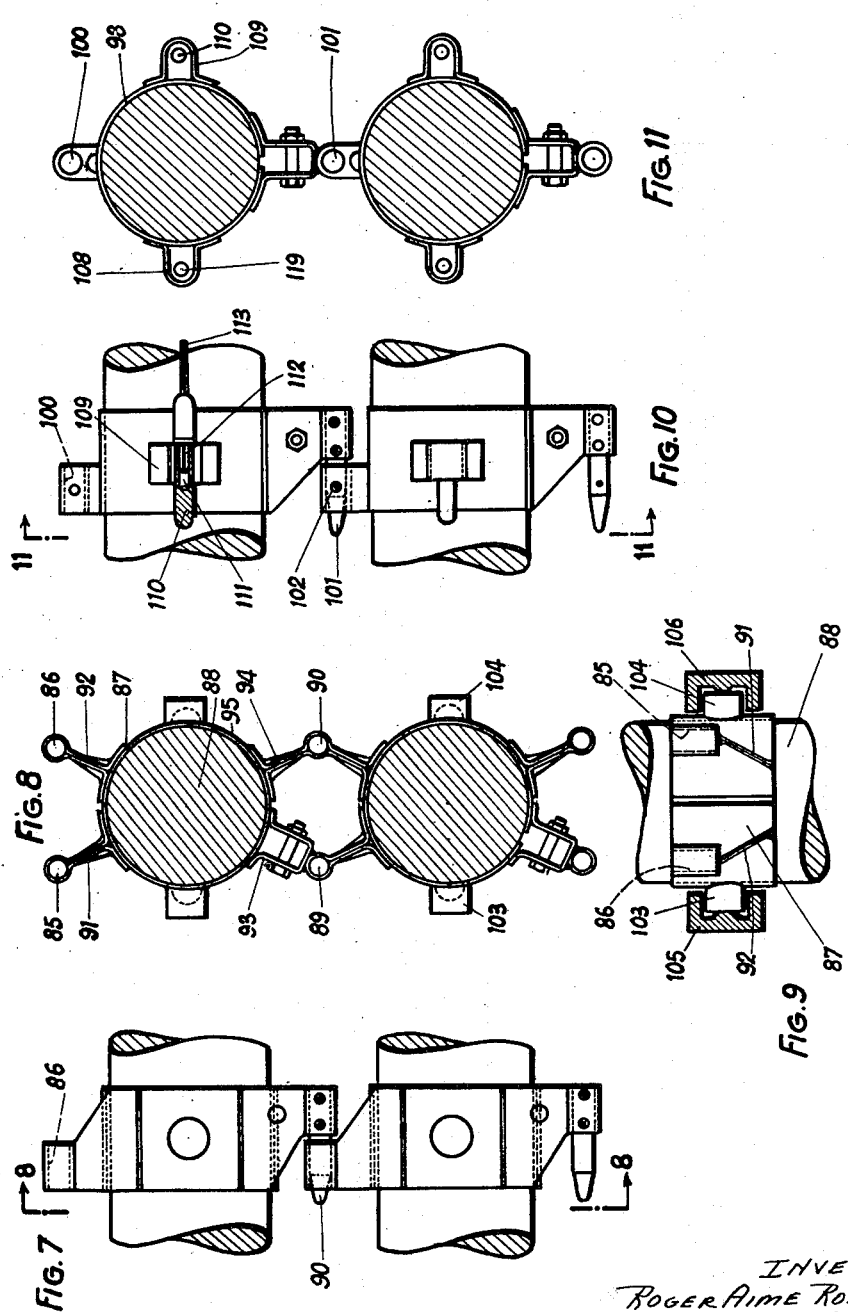

March 10, 1953  R. A. ROBERT ET AL  2,630,740
APPARATUS FOR LAUNCHING ROCKET BOMBS FROM AIRCRAFT
Filed Oct. 22, 1949  5 Sheets-Sheet 4
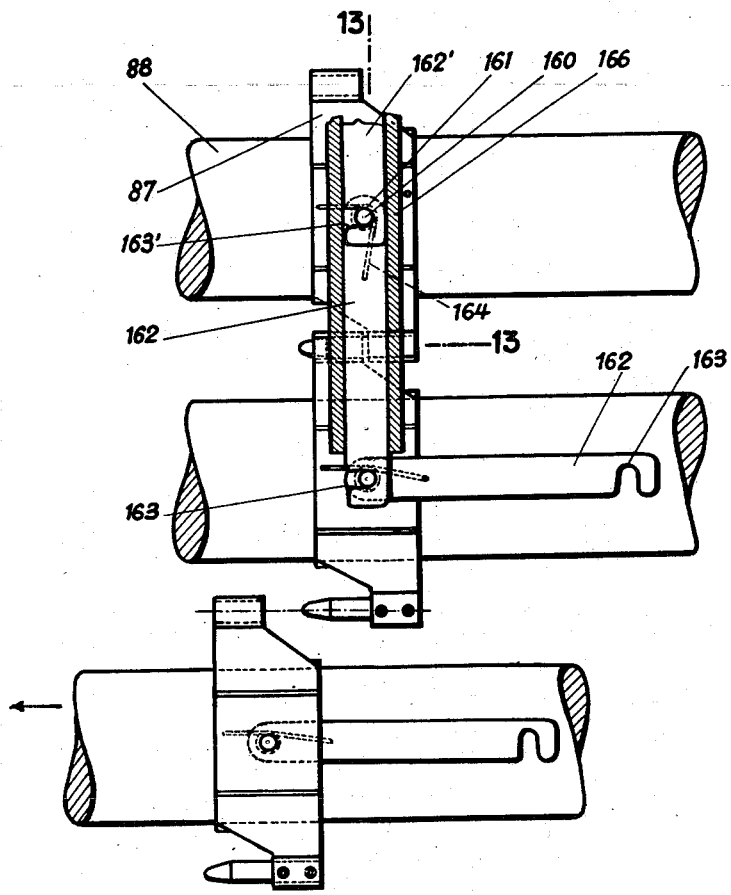
FIG. 12
FIG. 13
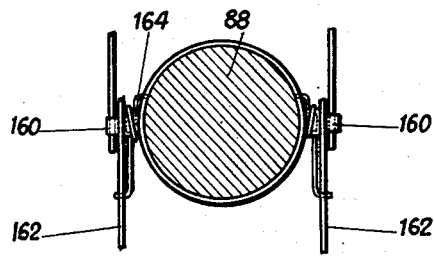
INVENTORS:
ROGER AIME ROBERT
PIERRE PAUL MATGE
By:
Haseltine, Lake & Co.
AGENTS

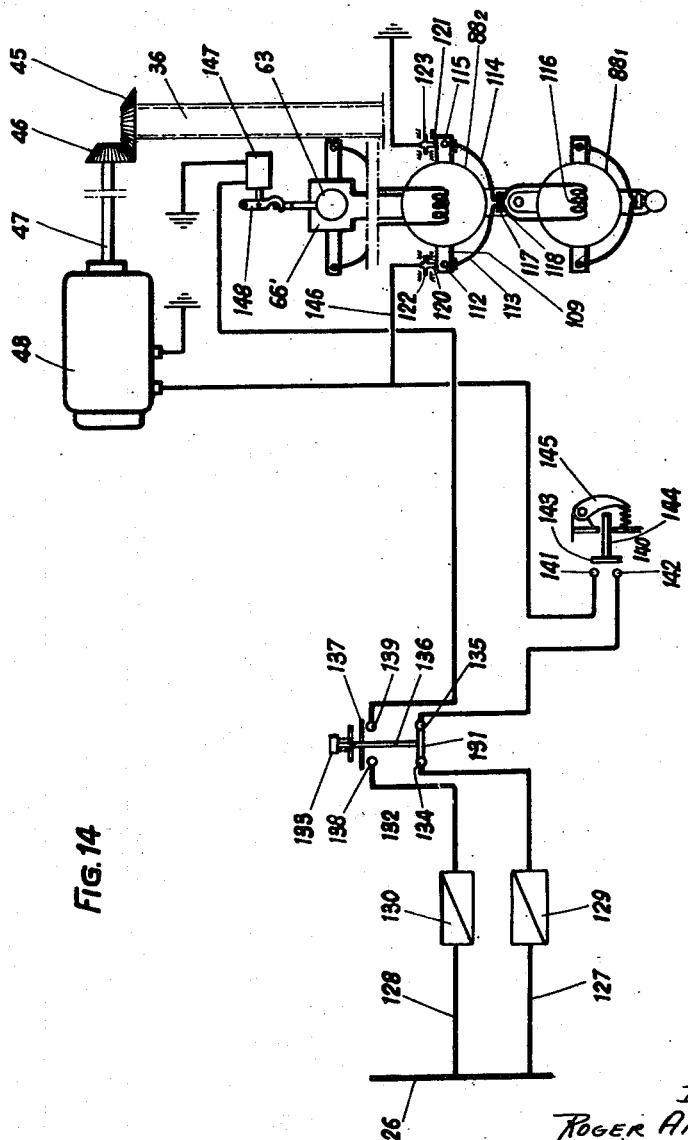

Patented Mar. 10, 1953

2,630,740

UNITED STATES PATENT OFFICE 2,630,740

APPARATUS FOR LAUNCHING ROCKET BOMBS FROM AIRCRAFT

Roger Aimé Robert, Boulogne-sur-Seine, and Pierre Paul Matge, Aubervilliers, France; said Matge assignor to said Robert Application October 22, 1949, Serial No. 122,888
In France October 29, 1948

8 Claims. (Cl. 89—1.7)

This invention relates to an apparatus for launching rocket-bombs or rockets from aircraft.

It is an object of the invention to provide an apparatus for launching rocket-bombs from aircraft which enables a plurality of rocket-bombs to be launched or fired in quick succession, thereby conferring to said aircraft a considerably increased destructive capacity.

Another object of the invention is to provide an apparatus for launching rocket-bombs from aircraft whereby, at the will of an operator, one, or more, or all of the load of rockets carried by said aircraft may be selectively launched or fired.

A further object comprises a rocket-launching or firing device of the type described which permits of the rockets being successively fired in accurately predetermined ballistic conditions, said conditions remaining strictly the same as from one of the rockets to another regardless of the rank of the rocket in the succession of rockets fired, thereby ensuring accurate and highly efficient fire.

It is another object to provide a rocket-firing device of the type described wherein the rockets are adapted to be positively maintained in all directions and are blocked in stationary condition regardless of any forces that may be applied to them due to acceleration effects exerted on the carrier aircraft, both in magnitude and direction.

It is also an object of this invention to provide a rocket-launching device for aircraft such that said rockets may be fired at any moment and independently of any forces they may have been subjected to prior to the time of firing due to acceleration of said aircraft.

Another object lies in the provision of a rocket-firing device of the type described wherein firing of each individual rocket is automatically produced upon said rocket reaching its firing position.

Another object is to provide a rocket-firing device for aircraft in which automatic firing of each rocket successively reaching its firing position as mentioned in the foregoing paragraph is produced in a simple, safe and reliable manner.

Another object is to provide such a rocket-firing device which is of comparatively reduced size and is adapted to contain a substantially high number of rockets within a relatively small space.

Another object resides in such a rocket-launching device for aircraft which comprises means enabling the entire rocket-load carried by the aircraft to be dropped or cast off in inert condition in case of necessity.

A further object lies in the provision of such a rocket-firing device which may be easily and quickly loaded.

And an object is to provide such a rocket-launching device which is simple of construction and reduced in weight.

In the ensuing description, given by way of illustration rather than of limitation, reference is made to the accompanying drawings, in which:

Fig. 1 is a general view in side elevation and partly in section with one of the side-panels of the magazine removed and certain other parts omitted for greater clarity;

Fig. 2 is a vertical section on line 2—2 of Fig. 1;

Fig. 3 is a vertical section on line 3—3 of Fig. 1;

Fig. 4 is an overhead plan view, with the cover and the drive mechanism removed;

Fig. 5 is a longitudinal section on an enlarged scale of the upper portion of the rocket-firing apparatus of the invention;

Fig. 6 is a front view of the portion of the apparatus shown in Fig. 5;

Fig. 7 is a side elevation on a still further enlarged scale showing the front portion of the means connecting a rocket-bomb with another rocket-bomb;

Fig. 8 is a transverse section on line 8—8 of Fig. 7;

Fig. 9 is a partial overhead plan view of a rocket contained in the magazine;

Fig. 10 is a view similar to Fig. 7 but relating to the rear portion of the means interconnecting the rockets;

Fig. 11 is a section on line 11—11 of Fig. 10;

Fig. 12 is a side elevation showing part of the rocket interconnecting means in a modification of the invention;

Fig. 13 is a transverse section on line 13—13 of Fig. 12 with some parts removed for greater clarity and Fig. 14 is a wiring diagram of the electric control circuit of the apparatus.

An apparatus according to the invention comprises a magazine 20 disposed in the aircraft, for instance in the fuselage thereof, and a number of tubular framework elements of the magazine are shown at 21 to 30. The magazine comprises rear side-wall elements 31 and 32 and intermediate partition element 33 thus defining two longitudinally extending compartments 34 and 35 parallel to the longitudinal centre plane of the carrier aircraft and overlying an opening in the bottom of the fuselage.

Internally the magazine comprises two vertical threaded rods 36 and 37 arranged with their centre axes in the longitudinal centre plane X—X. Each of said threaded rods is maintained at the bottom of the magazine with a ball-bearing pivot 38 and is provided at its top with an appendage 39 through which the rod is connected with a shaft 40 by means of a pin 41. Keyed on the shaft 40 and mounted within an upper casing in ball-bearings 43 and 44 is a bevel pinion 45 in mesh with a mating bevel pinion 46 whose shaft 47 is driven from an electric motor 48 (Fig. 14). Each of the rods 36 and 37 respectively cooperates with complementarily threaded bores 49 and 49' respectively, formed in a pair of transverse bridge-members 50, 50', interconnecting the pair of longitudinal girders 51, 51'. Each of the girders is formed at each of its ends with a vertical chimney, said chimneys respectively numbered 52, 53 and 52', 53'. In each of the chimneys there is secured a liner 54. Said liners each present a cylindrical bearing surface 55 and a tapered bearing surface 56 cooperating with mating journal surface 57 and 58 formed on a finger 59. The finger 59 is solid with a bracket 60 formed with an aperture 61 in which is mounted a cylindrical journal 62 forming the extremity of a tube 63. The opposite end of the tube 63 is formed as a journal 64 similar to the journal 62 engaging an aperture 65 formed in a bracket 66. The bracket 66 is solid with a finger 67 mounted in the rear chimney 53. The dual girder structure 51, 51' thus supports two parallel longitudinally-extending tubes 63, 63' respectively in generally common vertical planes with the compartments 34 and 35.

Extending from end to end through the tube 63 is a sleeve 64 which serves to house an internally-threaded bushing 65 provided with a flange 66 at its lower end and cooperating with a threaded rod 67 terminating externally of the tube 63 in an eye-hole 68. Said eye-hole has inserted thereinto the end 69 of a hook member 70 mounted for rotation about a pin 71. The hook member 70 is provided with a shoulder 72 adapted to cooperate with the end 73 of a lever 74 mounted for rotation about a pin 75. The opposite end 76 of lever 74 is provided with a notch 77 engaged by the end of a crankpin 78 mounted for rotation about a pin 79. The lever 74 is subjected to the action of a spring 80 urging the end 73 to a retracted position with respect to the shoulder 72, such retraction being prevented in the position of parts shown in Fig. 5 by the cooperation of the notch 77 with the crank-pin 78.

The bracket 60 supports two arms 81 and 82 in each of which are mounted pins 83 and 84 respectively. Said pins are threaded through eye-holes 85 and 86 formed on a collar member 87 rigid with the body 88 of a rocket-bomb adjacent the forward end thereof. The collar 87 carries pins 89 and 90 at its bottom.

In the form of embodiment shown, the suspension means comprising studs or pins and the cooperating eye-holes are formed at the ends of appendages 91, 92, 93 and 94 solid with a ring 95 surrounding the body of a rocket. In this manner the said suspension means are spaced from the axis of the next following rocket by a predetermined distance which is the same for the respective pins and eye-holes.

Each rocket 88 further comprises rearwardly thereof a collar 98 similar to the collar 87 but which comprises as its only suspension means an eye-hole 100 and a pin 101 placed in a diametric plane which is a plane of symmetry for the suspension means of the forward collar 87.

The collars 87 and 98 with their related pins and eye-holes serve to suspend the rockets 88 from the tube 63 or from the tube 63' as the case may be, as well as to suspend the rockets from each other. Each of the compartments 34 and 35 thus contains a rank or bank of rockets arranged one above another with their axes parallel to the longitudinal centre plane of the aircraft, and suspended from one another, all of the rockets of a bank being suspended from the tube which surmounts the bank under consideration, respectively 63 or 63', said tubes in turn being suspended from the girders 50, and 51 through the medium of the hooks 70. The connection between the rearmost pin 101 and the eye-hole 100 of the lowermost rocket into which said pin is inserted is completed by an easily shearable cotter-pin or shear-pin 102.

The front collars 87 each comprise, in diametrically opposed relationship and arranged in a plane perpendicular to the plane for symmetry of the suspension means, two cylindrical studs 103 and 104, which, for the rockets of compartment 35, are housed in vertical guide rails 105 and 106 U-shaped in cross-section, rigidly connected with the framework of the magazine and preferably provided with an annular protuberance 107 serving to localize the line of contact engagement between said studs and the rails. Guide rails or channels 105' and 106' are similarly present in the compartment 34. (It should be understood that the expression "compartment" as used herein does not necessarily signify a complete enclosure, but merely a portion or section of the magazine 20 assigned to one of the banks of rockets.)

The rear collars 98 have secured thereto on each side thereof straps 108 and 109 which each carry a forwardly directed contact finger 110 made of an electrically conductive material. The contact fingers are formed toward the rear ends thereof with blind holes 111 in which contact plugs 112 are inserted, said plugs being slightly expansible and mounted on the end of a wire conductor 113. The rear collar 98 of each rocket thus has two conductors 113 and 114 leading thereto (see Fig. 14) respectively terminating at the contact plugs 112 and 113. The wires 113 and 114 of a rocket are electrically connected with the ends of a firing resistor 116 of the immediately lower rocket, through the medium of an electrical connecting member comprising two elements 117 and 118 readily separable upon being pulled away from each other. The contact finger 110 and the opposite contact finger 119 in each rocket are adapted to cooperate during the downward movement of the rocket through the magazine, as described presently, with contact strips 120 and 121 mounted at the bottom of the magazine for rotation about pins 122 and 123 and constantly subjected to the urge of springs (not shown) urging them toward the fingers 110 and 119.

For the uppermost rocket of a file or bank, the wires supplying current to the resistors 116 extend from plugs 112' and 115' inserted into conductive fingers carried by appendages 108' and 109' carried by the bracket 66'.

The wire 127 serves to supply the electric motor 48; and a normally open cut-off switch 140 is interposed in the circuit. The switch comprises two fixed contact elements 141 and 142 adapted to be electrically connected by a strip 143 carried on a rod 144 adapted to be depressed under the action of a firing trigger 145. The wire 127 moreover interconnects through the medium of a branch connection 146 the contact arm or strip 120 with the feeder 126, the opposite strip 126 being earthed. The conductor 147 has interposed therein the winding of an electromagnet 147 the movable element of which may either be directly connected with a rotatably mounted hook 148 (which plays the part of the hook 70 of Figs. 1 and 5) or may be connected with the crankpin 78 shown in Fig. 5.

The rockets at their rear ends are provided with collapsible fins 149 each comprising an internal element 150 solid with the body of the rocket and an outer element 151 pivotally mounted on the inner element, resilient means being interposed between both said elements urging the outer element 151 to extended condition.

The above-described apparatus operates as follows:

The magazine is charged with a supply of rocket-bombs. The rocket-bombs in the magazine form two vertical banks or files with the rockets in each file disposed above one another and suspended to or from one another, each file as a whole being supported from the tubes 63, 63', which tubes in turn are attached to the girders 51, 51'. The rockets in each file are vertically displaced or offset with respect to those of the adjacent file as clearly shown in Figs. 2 and 3, in such a way that the horizontal plane of a rocket in the right-hand compartment passes at an equal distance from the horizontal centre planes between two successive rockets of the left-hand compartment.

When it is desired to launch or fire a rocket, it is merely necessary to depress the trigger 145. The circuit 127 is then completed and the motor 48 started. The motor through the bevel-gearing 45—46 drives the shaft 40 and the screw-rods 36 and 37 which start revolving about their axes. The girders 51 and 51' which are prevented from rotating because of their connection with the rockets and whose threaded apertures 49, 49' cooperate with the said screw-rods, move downwardly along the latter and thus are effective to feed the rockets in the respective files down towards the outlet apertures 152 and 153.

During this feed movement, and also in the rest condition, the rails 105, 106 and 105', 106' are effective to maintain the rockets against any forces that may be exerted thereupon in any direction whatever, in particular those resulting from any accelerations of the aircraft or from rapid changes in its attitude.

The lowermost rocket of the right-hand file (Fig. 2) projects from the magazine and the aircraft, whereas the lowermost rocket of the left-hand file is still contained in the magazine. The lowermost rocket of the right-hand file $88_1$ reaches its firing position (shown in chain lines in Fig. 2) which is the closest position to the outlet 153 consistent with extension of the tail-fins of the rocket. While the rocket is within the magazine, its tail-fins are folded, as the walls 31, 32 prevent expansion thereof. During the progression of a rocket outwardly of the magazine, its tail-fins expand progressively as they escape from the constraining action of the walls and they reach a fully extended or expanded condition as the rocket attains its firing position, or position of release.

Upon the rocket $88_1$ reaching its firing position, the contact fingers 112 and 115 of the rocket $88_2$, which is next higher in rank, cooperate with the contact strips 120 and 121. An electric current then flows through the wires 113 and 114 and the resistor 116 of the rocket $88_1$; the latter is then fired and released, the shear-pin 102 being sheared under the thrust imparted to the rocket. Upon release of the rocket the electric connecting element 118 attached to the rocket $88_1$ becomes separated from the element 117 attached to the rocket $88_2$.

On release of the rocket $88_1$ the lowermost rocket $88_1'$, of the left-hand compartment is in the position shown in chain lines in Fig. 2. Its upper fins are then only partly expanded. The rockets in both banks move further down and the rocket $88_1'$, in its turn reaches the position of release: it is automatically fired as previously described through the cooperation of the contact fingers of the rocket $88_2'$, with the contact plates arranged adjacent the bottom outlet of the compartment 34.

Launching of the rockets thus proceeds in succession, the rockets in each bank being released in alternating sequence so long as pressure is maintained upon the trigger 145. So soon however as the trigger is released the motor 48 is no longer supplied and both the downward feed movement of the rockets and the firing is suspended. Operation is resumed upon finger-pressure being again applied to the trigger 145.

Should for any reason it be necessary to drop the whole supply of rocket-bombs remaining in the magazine, it is merely necessary to press the button 133. The circuit 127 is first opened, the strip 137 disengages the contacts 134 and 135; the rockets are thus put into an inert condition. The strip 137 cooperates immediately thereafter with the contact elements 138 and 139, thereby completing the circuit 128. The electromagnet 147 is energized and the hook 70 (or 148) is released. The weight of the rockets exerted on the eye-hole 68 swings the hook 70 (or 148) and both banks of rockets together with the tubes 63, 63' surmounting them move down through the magazine under the action of gravity and are dropped in inert condition into space. The downward movement in this dropping operation is also guided by the rails 105, 106.

In the modification shown in Figs. 12 and 13, the suspension of the rockets from one another is accomplished with the help of flat hooks, in addition to the collars 87 and 98 with the cooperating studs and eye-holes, said flat hooks being disposed laterally on each side of the collars. This alternative is particularly applicable in connection with the firing of heavyweight rocket-bombs.

In this alternative, each collar 87 (or 98) laterally comprises knobs or buttons 160. From one of the knobs 160 a hook 162 is attached through a hole 161 formed at the top of the knob, said hook 162 being formed with a notch 163 adjacent its bottom. The knobs 160 further have attached thereto an upper hook 162' through upper notches 163' thereof. The rockets in a bank are thus supported by two series of vertical hooks, the upper hooks of each series being pivoted on the bracket 60. Around each of the knobs 160 there is moreover threaded a spring 164 which acts to urge the lower hook 162 in such a direction that, after the rocket supported therefrom has been released, said hook is brought to a horizontal position. The hooks move over guide channels or rails 166 similar in function to the rails 105 and 106.

What we claim is:

1. An airplane armament apparatus which comprises: a rocket-bomb release apparatus including a magazine housed in the fuselage of said aircraft and fixed relatively thereto, a lower outlet aperture in said magazine, a string of rocket-bombs in said magazine over said outlet, suspension means for each rocket adapted to sustain the weight of the rockets of said string included between said each rocket and said outlet, hanger means supporting said string, means for feeding said hanger towards said outlet, means for guiding the rockets in the magazine during such feed displacement, and firing means operative to fire a rocket as it emerges from said magazine through said outlet.

2. An armament assembly for an airplane having a fuselage, which comprises: a plurality of rocket-bombs in parallel substantially superimposed relationship in said fuselage above a lowermost outlet thereof, suspension means interposed between each adjacent pair of rocket-bombs for supporting a rocket-bomb from the rocket-bomb next above it, a hooking support for the uppermost rocket-bomb of said plurality, means for feeding said hooking support towards said outlet, guide means for guiding said rocket bombs in such feed displacement, and firing means operative to fire a rocket bomb as it emerges from the fuselage through said outlet.

3. In an airplane: a fuselage, an outlet in the bottom of said fuselage, a string of longitudinally-extending rocket bombs in said fuselage overhanging said outlet suspended from one another in parallel and substantially contiguous relationship, means for supporting and for feeding said string towards said outlet, and means for firing a rocket bomb as it emerges from the fuselage through said outlet.

4. Airplane as in claim 2, wherein said supporting and feeding means comprise a pair of girders in superimposed relationship, the lower girder suspended from the upper girder through retractible hooking means.

5. String of two rocket bombs which comprises: a pair of longitudinally-spaced collars on the body of each rocket, a pair of female members in a diametric plane of said first collar and on either side of said plane and rigid with said first collar, a pair of male members rigid with said first collar in diametrically opposed relation to said female members in the same longitudinal position relatively to the rocket body as said female members, a female member rigid with said second collar in said diametric plane and a male member diametrically opposite said female member in the same longitudinal position as said female member relatively to said rocket body.

6. In an airplane including a fuselage: an outlet in said fuselage, a plurality of rocket bombs overlying said outlet in parallel superimposed relationship, means for supporting said rocket bombs and bodily feeding them towards said outlet, firing means comprising: on each rocket electric ignition means, a circuit connected with said ignition means and including contact means carried by the rocket next above the said first-mentioned rocket, and second contact means carried by the fuselage cooperating with said first contact means adjacent said outlet to fire said first-mentioned rocket.

7. In an airplane: a fuselage, an outlet in the bottom thereof, a rank of rocket bombs overlying said outlet and suspended from one another, means for feeding said rank towards said outlet, and means for firing said rank as it has issued out of said bottom through said outlet.

8. Armament assembly for an airplane having a fuselage, which comprises: an outlet in said fuselage, guide means overlying said outlet in a longitudinal central plane of said outlet, suspension means cooperating with said guide means and including transverse hanger means on either side of said central plane, two ranks of finned rocket bombs suspended from said hanger means and suspended from one another, means for feeding said suspension means towards said outlet, means for firing a rocket bomb of each rank as it issues out of the fuselage through said outlet, the rockets in one rank being staggered relatively to those of the other rank.

ROGER AIMÉ ROBERT.
PIERRE PAUL MATGE.

REFERENCES CITED

The following references are of record in the file of this patent:

UNITED STATES PATENTS

| Number | Name | Date |
| --- | --- | --- |
| 2,421,893 | Lambert et al. | June 10, 1947 |
| 2,451,745 | Jolly | Oct. 19, 1948 |
| 2,459,314 | Goodhue | Jan. 18, 1949 |

FOREIGN PATENTS

| Number | Country | Date |
| --- | --- | --- |
| 421,262 | Great Britain | Nov. 9, 1934 |
| 596,288 | Great Britain | Jan. 1, 1948 |
| 710,422 | Germany | Sept. 12, 1941 |

OTHER REFERENCES

OSRD 5787, February 1946, "The Development of Rocket Fins and Lug-Band Kits for Use With Flush-Mount Launcher on Aircraft" by G. W. Engstrom and R. I. Beddoe, Final Report Series W No. 18.4 from Allegany Ballistics Laboratory. Marke unclassified April 26, 1950. (Copy in Division 70).